United States Patent
Linnemann et al.

(12)

(10) Patent No.: US 6,395,638 B1
(45) Date of Patent: May 28, 2002

(54) METHOD FOR PRODUCING A MICROMEMBRANE PUMP BODY

(75) Inventors: Reinhard Linnemann; Martin Richter; Stefan Kluge; Peter Woias, all of München (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/381,222

(22) PCT Filed: Apr. 28, 1998

(86) PCT No.: PCT/EP98/02506

§ 371 (c)(1),
(2), (4) Date: Sep. 15, 1999

(87) PCT Pub. No.: WO98/51928

PCT Pub. Date: Nov. 19, 1998

(30) Foreign Application Priority Data

May 12, 1997 (DE) .......................................... 197 19 861

(51) Int. Cl.⁷ ............................................ H01L 21/302
(52) U.S. Cl. ...................... 438/706; 438/719; 438/723; 438/745; 438/753; 438/756; 417/413.1; 417/413.2; 417/413.3
(58) Field of Search ................................ 438/706, 719, 438/745, 753, 723, 756; 417/413.1, 413.2, 413.3

(56) References Cited

U.S. PATENT DOCUMENTS

| 4,826,131 A | * | 5/1989 | Mikkor | .................. 251/129.17 |
| 5,529,465 A | * | 6/1996 | Zengerle et al. | ......... 417/413.2 |

FOREIGN PATENT DOCUMENTS

| DE | 4143343 | * | 10/1991 |
| DE | 69401250 | * | 5/1994 |
| EP | 0134614 | * | 3/1985 |
| EP | 0518524 | * | 12/1992 |
| EP | 0703364 | * | 9/1994 |
| WO | 97/28376 | * | 8/1997 |

OTHER PUBLICATIONS

Van Lintel et al., "A Piezoelectric Micropump based on Micromachining of silicon", Mar. 17, 1988, Sensors and Actuators, 15, pp. 153–167.*

Bugstens et al., "Micromembrance Pump Manufactured by Molding", Jun. 15–17, 199, 4th International conference on New Actuators.*

R. Zengerle, "Mikro–Membranpumpen Als komponenten Fur Mikro–Fluidsysteme", 1994, Verlag Shaker Aachen pp. 11–16.

"Magnetostrictive Thin Film Microflow Devices", Sep. 17–19, 1996, 5$^{th}$ International Conference on Micro Electro, Opto, Mechanical Systems and Components.

* cited by examiner

Primary Examiner—Benjamin L. Utech
Assistant Examiner—Charlotte A. Brown
(74) Attorney, Agent, or Firm—Beyer Weaver & Thomas, LLP

(57) ABSTRACT

A method of producing a pump body having an inlet opening provided with an inlet valve (106) and an outlet opening provided with an outlet valve (108), said method comprising as a first step the step of structuring a respective first main surface of a first and of a second semiconductor disc (200) for defining a valve flap structure (202) of the inlet valve and a valve seat structure (204) of the outlet valve in the first disc and a valve flap structure of the outlet valve and a valve seat structure of the inlet valve in the second disc. Following this, a valve flap well structure (206; 216) and a valve opening well structure (208; 218) are formed in a predetermined relationship with the valve flap structures and the valve seat structures in a respective second main surface of the first and of the second semiconductor disc. The first main surfaces of said first and second semiconductor discs are connected in such a way that the respective valve flap structure is arranged in a predetermined relationship with a respective valve seat structure. Finally, the respective second main surface of said first and of said second semiconductor disc is etched at least in the area of the valve flap well structure and of the valve opening well structure so as to expose the valve flaps and open the valve seats.

10 Claims, 6 Drawing Sheets

Fig. 6a)
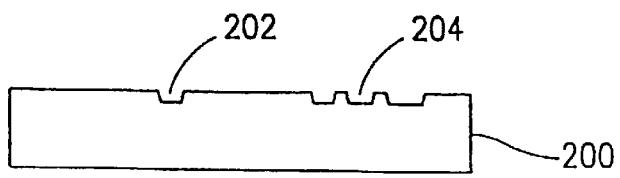
Fig. 6b)
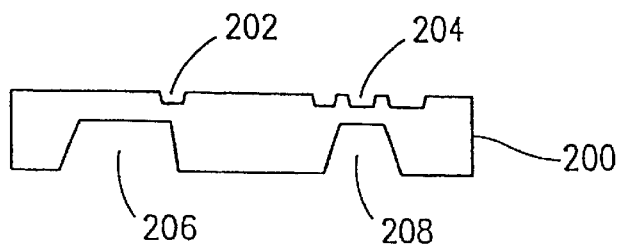
Fig. 6c)
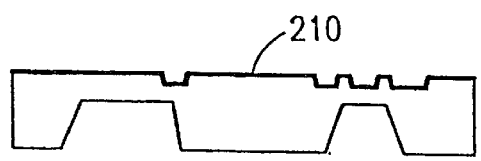
Fig. 6d)
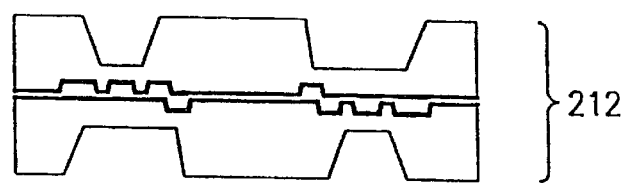
Fig. 6e)
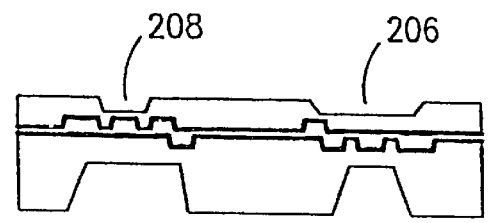
Fig. 6f)
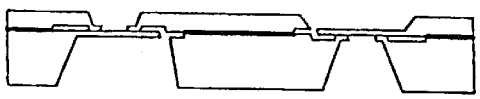
FIG. 6

Fig. 7a)
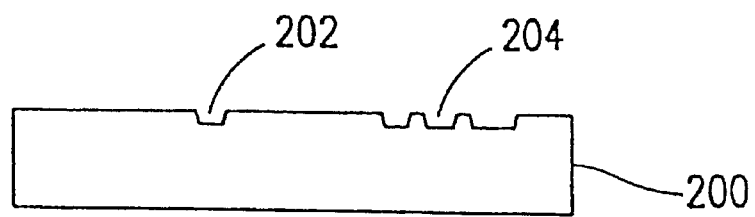
Fig. 7b)
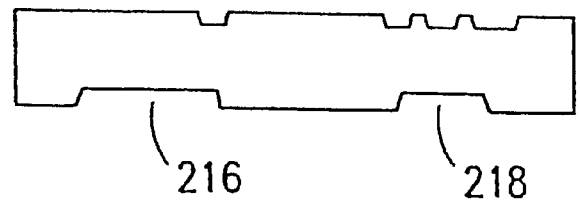
Fig. 7c)
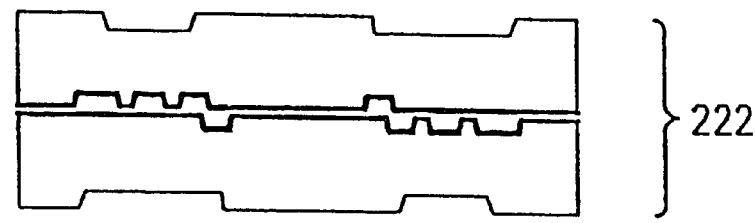
Fig. 7d)
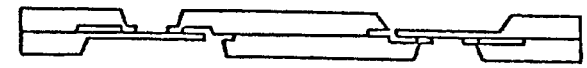
FIG. 7

FIG. 8

METHOD FOR PRODUCING A MICROMEMBRANE PUMP BODY

The present invention relates to a method of producing a pump body and, in particular, to a method of producing a pump body for a micromembrane pump comprising a pump membrane, a pump body and inlet and outlet openings provided with passive non-return valves.

According to the prior art a large number of different micromembrane pumps exists, the drive concepts used being predominantly electromagnetic, thermal and piezoelectric driving principles. Electromagnetic driving principles for micromembrane pumps provided with non-return valves are described e.g. in E. Quandt, K. Seemann, *Magnetostrictive Thin Film Microflow Devices,* Micro System Technologies 96, pp. 451–456, VDE-Verlag GmbH, 1996.

Thermal drive concepts are explained e.g. in B. Büstgens et al, *Micromembrane Pump Manufactured by Molding,* Proc. Actuator 94; Bremen 1994, pp. 86–90. EP-A-0134614 and H. T. G. Van Lintel et al, *A Piezoelectric Micropump Based on Micrmachining of Silicon,* Sensors & Actuators, 15, 1988, pp. 153–167, explain piezoelectric driving principles for micromembrane pumps which make use of active or passive non-return valves.

A known micromembrane pump which has an electrostatic drive and which is provided with a pump body having integrated therein an inlet and an outlet opening, which are each provided with non-return valves, is described in R. Zengerle: *Mikromembranpumpen als Komponenten für Mikro-Fluidsysteme;* Verlag Shaker; Aachen 1994; ISBN 3-8265-0216-7, as well as in DE 41 43 343 A1. Such a micropump is shown in FIG. 1.

The micropump shown in FIG. 1 consists of four silicon chips, two of said chips defining the electrostatic actor consisting of a flexible pump membrane 10 and a counterelectrode 12 which is provided with an insulating layer 14. The two other silicon chips 16 and 18 define a pump body having flap valves 20 and 22 arranged therein. A pump chamber 24 is formed between the pump body, which is defined by the silicon chips 16 and 18, and the flexible pump membrane 10, which is connected to the pump body along the circumference thereof. A spacer layer 28 is arranged between the suspension devices 26 of the flexible pump membrane 10 and the counterelectrode.

When an electric voltage is applied to the electrostatic actor, the elastic pump membrane 10 is electrostatically attracted to the rigid counterelectrode 12, whereby a negative pressure is generated in the pump chamber 24, said negative pressure having the effect that the pump medium flows in via the inlet flap valve 22, cf. arrow 30. When the voltage has been switched off and the charge has been balanced by short-circuiting the electrodes, the pump membrane will relax and displace the pump medium from the pump chamber via the outlet flap valve 20.

With the exception of the different drive means, also a piezoelectrically driven micropump could have the structural design of the micropump body described in FIG. 1.

DE 694 01 250 C2 describes methods for producing a micropump in the case of which a silicon plate having valve structures formed therein is connected to an end plate.

It is the object of the present invention to provide a simple method of producing a pump body at wafer level, said method permitting in addition the production of a pump body which is suitable for producing a micromembrane pump having a high compression ratio.

This object is achieved by a method according to claim 1.

The present invention provides a method of producing a pump body having an inlet opening provided with an inlet valve and an outlet opening provided with an outlet valve. The first step of said method is the step of structuring a respective first main surface of a first and of a second semiconductor disc for defining a valve flap structure of the inlet valve and a valve seat structure of the outlet valve in the first disc and a valve flap structure of the outlet valve and a valve seat structure of the inlet valve in the second disc. Following this, a valve flap well structure and a valve opening well structure are formed in a predetermined relationship with the valve flap structures and the valve seat structures in a respective second main surface of the first and of the second semiconductor disc. The first main surfaces of said first and second semiconductor discs are connected in such a way that the respective valve flap structure is arranged in a predetermined relationship with a respective valve seat structure. Finally, the respective second main surfaces of said first and of said second semiconductor disc are etched at least in the area of the valve flap well structure and of the valve opening well structure so as to expose the valve flaps and open the valve seats.

The above-described electrostatically driven micromembrane pumps have a plurality of disadvantages when used in the form shown e.g. in FIG. 1.

Due to the small stroke of the micromembrane and the comparatively large pump chamber volume, such a known pump has a very small compression ratio. The term compression ratio stands for the ratio of the displaced pumping volume to the total pump chamber volume. Due to this small compression ratio, it is impossible to convey compressible media, such as gases, since the compressibility of such media normally exceeds the compression ratio of the pump.

Furthermore, the pump chamber of the known pump described has a geometry which is disadvantageous as regards fluid dynamics and which is, moreover, not bubble tolerant. Inclusions of air in a fluid pump medium accumulate in the pump chamber and, due to their comparatively high compressibility, they cause a substantial deterioration of the pumping characteristics. In addition, a self-priming behaviour cannot be achieved due to the poor compression behaviour.

Due to the production process used, the pump membrane of the known micropump is, in addition, in electrical contact with the medium conveyed. Since in an electrostatically driven micropump voltages in the order of 200 V occur at the actor during operation, substantial electric potentials may exist in the pump medium in the case of failure, and, depending on the respective case of use, these electric potentials may cause a malfunction of external components. In addition, known micropumps are mounted by glueing individual chips according to the prior art known at present, this kind of mounting being incapable of satisfying the requirements which have to be fulfilled for an efficient production.

Hence, micromembrane pumps with a reduced pump chamber volume would be advantageous for eliminating the above-mentioned disadvantages. One possibility of reducing the pump chamber volume would be to thin the valve chip which faces the drive means. But especially the thinning of such valve chips entails substantial problems. On the one hand, mechanical thinning, e.g. grinding or polishing, may perhaps cause damage to the flap due to the strong vibrations occurring during such mechanical thinning, i.e. the valve flap may break at its fixing point. A chemical process for thinning the valve chip cannot be used either, since the existing valve flaps must be protected against chemical removal, and this is only possible on the basis of a very high investment in the field of process engineering.

The method according to the present invention permits such thinning of the valve chip without any risk of damage being caused to the delicate valve flaps and without any high investment in the field of process engineering.

In addition, the method according to the present invention permits the pump bodies to be produced at wafer level; due to the stacklike structural design, the pump bodies produced are additionally suitable for a final assembly of a micromembrane pump at wafer level; in comparison with numerous other concepts, this is a concept which is very adavantageous from the point of view of production engineering.

Further developments of the present application are disclosed in the dependent claims.

In the following, preferred embodiments of the present invention will be explained in detail making reference to the drawings enclosed, in which:

FIG. 1 shows a known micromembrane pump with an electrostatic drive;

FIGS. 2a), 2b), 3a) and 3b) show micromembrane pumps with pump bodies which have been produced in accordance with methods according to the present invention;

FIG. 6 shows schematic cross-sectional views for explaining a first embodiment of the method according to the present invention;

FIG. 7 shows schematic cross-sectional views for explaining a second embodiment of the method according to the present invention.

Figure 1:
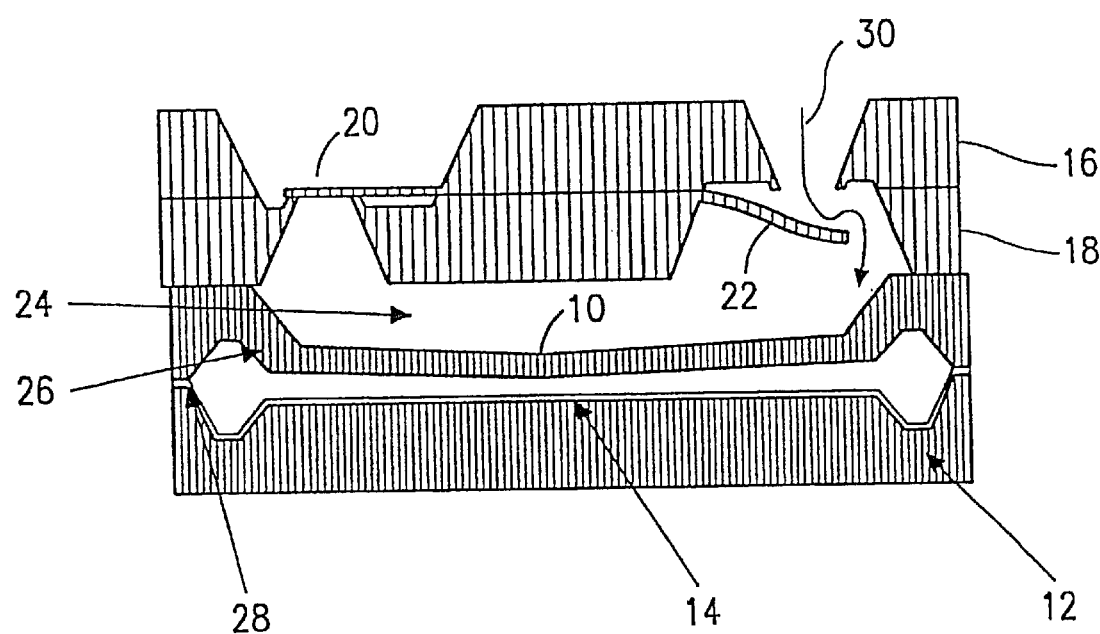

FIGS. 2a), 2b), 3a) and 3b) show embodiments of micromembrane pumps whose pump bodies have been produced by the method according to the present invention.

FIG. 2a) shows a micromembrane pump on the basis of a piezoelectric actor 100. The piezoelectric actor used will be explained in detail hereinbelow with regard to FIG. 5. A pump body is defined by two semiconductor discs, preferably silicon wafers, 102 and 104. The semiconductor discs 102 and 104 have formed therein an inlet valve 106 and an outlet valve 108 by means of micromechanical methods. As can be seen in FIG. 2a), the silicon substrate 102 is thinned for this purpose on the surface facing the micromembrane so as to permit a small pump chamber volume and, consequently, a high compression ratio to be realized.

Methods according to the present invention which are used for forming such a structure will be described hereinbelow with reference to FIGS. 6 to 8.

FIG. 2b) shows an embodiment of a micromembrane pump on the basis of an electrostatic drive. The electrostatic drive consists of a counterelectrode 120 and of an electrostatic actor 122 serving as a micromembrane. This electrostatic drive will be explained in detail hereinbelow with reference to FIG. 4.

A pump body is again realized by two silicon substrates 102 and 104 having passive non-return valves 106 and 108 formed therein. As can be seen in FIG. 2b), the electrostatic actor 122, which serves simultaneously as a micromembrane, is essentially planar so that said actor rests on the pump body in the areas outside of the inlet and outlet openings in which the non-return valves 106 and 108 are formed. Due to this structural design as well as due to the thinning of the valve chip, a high compression ratio can be obtained in the case of the electrostatic drive.

FIGS. 3a) and 3b) show two additional embodiments of a micromembrane pump, which differ from the embodiments shown in FIGS. 2a) and 2b) only with regard to the second silicon substrate defining the pump body. In the embodiments shown in FIGS. 3a) and 3b) also the second silicon substrate 104', which forms the pump body together with the silicon substrate 102, is thinned, said second silicon substrate being thinned on the side facing away from the micromembrane 122. A pump body of the type shown in FIGS. 3a) and 3b) is obtained by a production method of the kind explained hereinbelow with reference to FIG. 7.

Figure 4:
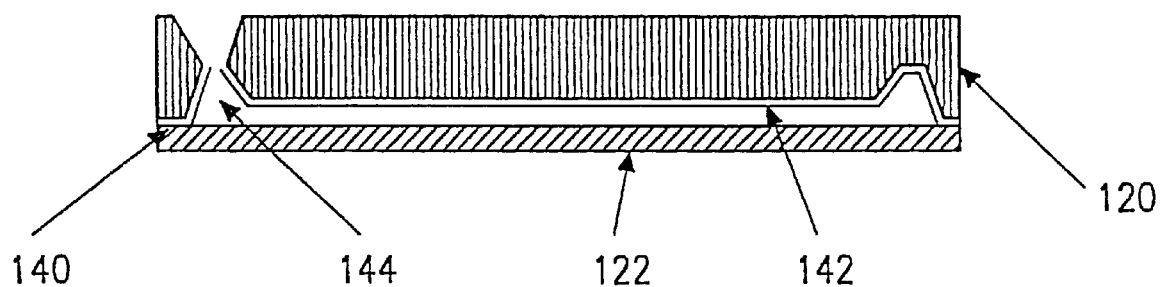
FIG. 4 shows an electrostatic micropump drive for a micromembrane pump.

FIG. 4 shows a planar electrostatic micropump drive which is adapted to be connected to a pump body so as to form a micromembrane pump, said pump body being produced in accordance with the method according to the present invention. The electrostatic drive differs from the drive shown in FIG. 1 essentially with regard to a planar actor consisting of a rigid counterelectrode 120 and a membrane 122 having a small thickness throughout the whole area thereof. Hence, the pump-chamber-volume percentage defined by the drive unit is reduced to zero, as can be seen in FIG. 2b), and this contributes essentially to an increase in compression.

The planar electrostatic actor described can be produced e.g. by the method described hereinbelow. First of all, starting wafers are produced for the counterelectrode 120 and the pump membrane 122. This comprises especially the provision of a possibility of electric contacting, e.g. the application of bond pads, and, in the case of electrically non-conductive starting materials, the production of a suitably structured conductive coating for realizing the electrode surfaces, again with the possibility of electric contacting. Subsequently, a spacer layer 140 is formed on the future mounting surface of the pump membrane 122 and of the counterelectrode 120. In addition, insulating layers 142 are formed on all points of contact of the two wafers so as to prevent an electric short circuit between the electrodes. The two starting wafers are connected by a structured connection at the spacer layer 140. Following this, the starting wafer for the pump membrane 122 is removed in full area until the desired final thickness of the pump membrane has been obtained.

Depending on the material chosen, a mechanical removal, e.g. by means of grinding, or etching can be used as a removing method for producing the flexible electrostatically driven pump membrane 122. For supporting etching processes, the pump membrane 122 can be implemented as a multilayer structure on the upper surface thereof, said multilayer structure including as lowermost layer an etch-stop layer on the future lower surface of the membrane. The production of the pump membrane does not require any structuring process so that in addition to the optimization of the compression ratio a minimization of the production costs can be achieved by such an essentially planar electrostatic micropump drive.

A more far-reaching structuring of the lower surface of the pump membrane, e.g. the production of additional auxiliary structures such as spacers or flow passages, can be subsequent removal or application of coatings, can take place after the full-area removal. This more far-reaching structuring includes e.g. the application of additional layers for increasing the chemical resistance, for electric insulation or for purposefully adjusting mechanical properties, e.g. a locally varying membrane thickness so as to achieve a locally inhomogeneous elasticity.

The materials that can be used as starting materials for the counterelectrode 120 and for the pump membrane 122 are especially silicon, glass or plastic materials. The spacer layer 140 can be produced in arbitrary combination by structuring or by additive application on one or on both of the two starting wafers. Depending on the starting materials used, the methods that can be used for connecting the counterelectrode 120 and the pump membrane are e.g. glueing for arbitrary materials, anodic bonding for silicon-glass combinations or silicon-silicon combinations with a glass spacer layer, or silicon fusion bonding for a silicon-silicon combination. In order to permit a connection method which requires an increase in temperature, e.g. in the case of anodic bonding, openings 144 are provided in the counterelectrode 120 of the electrostatic actor, said openings permitting an equalization of pressure with regard to the surroundings in the case of a temperature-dependent expansion and compression of the gas volume between the pump membrane 122 and the counterelectrode 120. These openings can also be arranged in the spacer layer 140.

Figure 5:
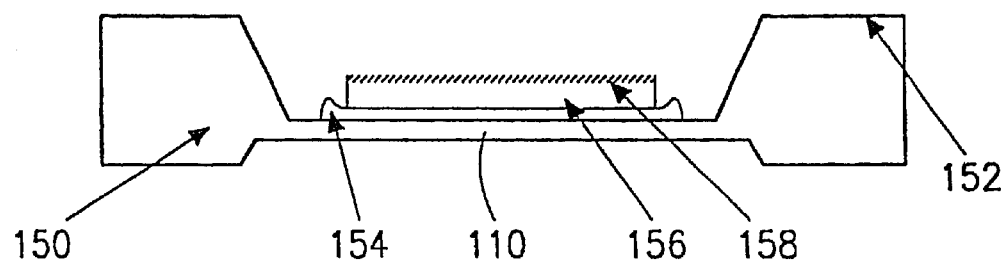
FIG. 5 shows a piezoelectric micropump drive for a micromembrane pump.
Figure 8A:
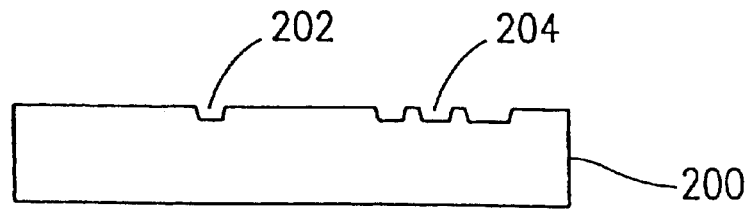
FIG. 8 shows schematic cross-sectional views for explaining a third embodiment of the method according to the present invention.
Figure 8B:
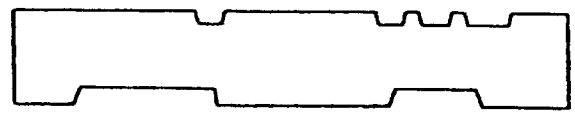
Figure 8C:
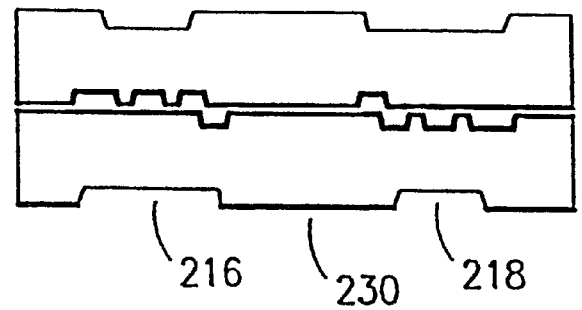
Figure 8D:
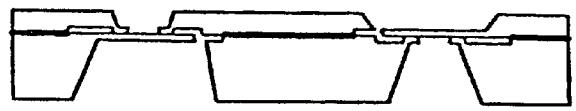

FIG. 5 shows a piezoelectric micropump drive which is adapted to be connected to a pump body so as to form a micromembrane pump, said pump body being produced by the method according to the present invention. A pump membrane 110 has fastening structures 150 for attaching the membrane 110 to a pump body. The fastening structures and the membrane are coated with an electrically conductive layer 152 on the side facing away from the pump body. By means of a connecting layer 154, a piezoactive material 156 is attached to the membrane 110. Also the piezoactive material 156 is coated with a conductive layer 158.

In the following, methods of producing the piezoelectric actor will be described briefly. First of all, the thin pump membrane 110 is formed; in so doing, structures guaranteeing later an optimum flow between the inlet valve and the outlet valve must be provided in the pump chamber. In addition, the lower surface of the pump membrane can be provided with a more far-reaching structure, e.g. by the production of additional auxiliary structures in the form of spacers and flow passages. Furthermore, coatings can be applied or removed subsequently. This includes again the application of additional layers for increasing the chemical resistance, for electric insulation or for purposefully adjusting mechanical properties, e.g. a locally varying membrane thickness so as to achieve a locally inhomogeneous elasticity.

Following this, the pump membrane 110 is connected to a piezoelectric material 156. The piezoelectric material may be in the form of a crystal or, alternatively, it may be applied in the form of a thin layer 156 directly to the pump membrane 110. Both sides of the piezomaterial must be electrically contactable, a non-conductive layer 154, e.g. an adhesive layer, being admissible as a connection between the lower piezosurface and the electrically conductive pump membrane 110, since an electric field is decisive for realizing the piezoeffect.

When also connection methods requiring an increase in temperature are used for producing the piezoelectric drive, it may perhaps be necessary to repolarize the piezomaterial 156 after the use of these methods. For this purpose, a high electric voltage has to be applied to the crystal; the material should have a temperature corresponding approximately to the Curie temperature of the actor material, typically 180° C.–350° C.

Figure 2:
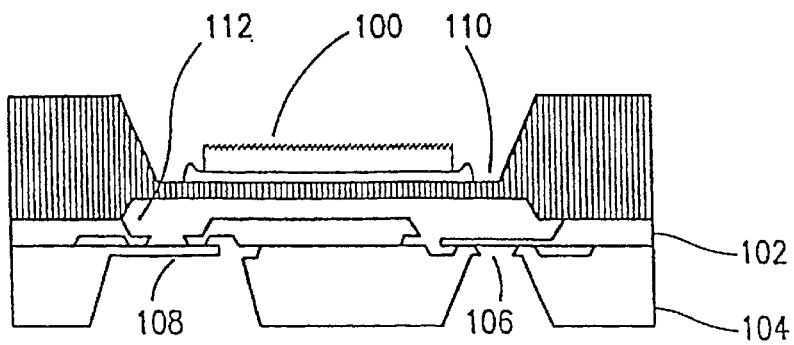
Figure 2:
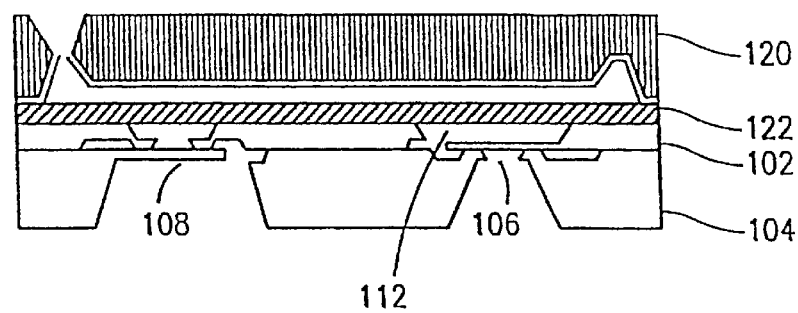
Figure 3:
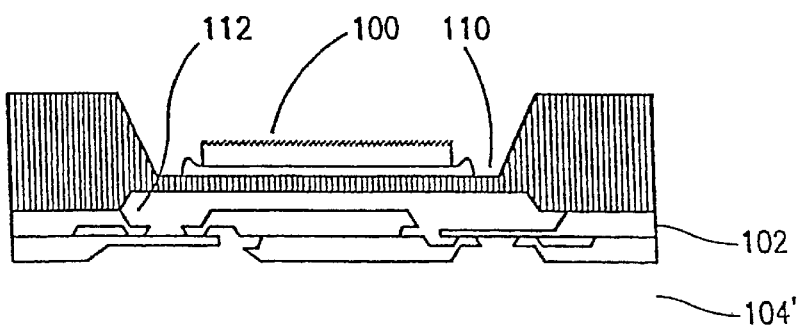
Figure 3:
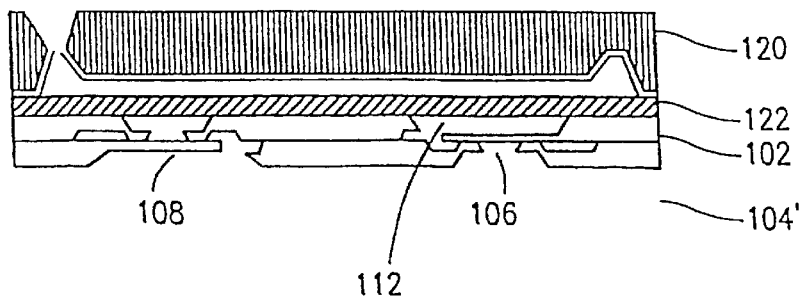

For forming a micromembrane pump, the actor devices described with respect to FIGS. 4 and 5 are attached to a pump body produced in accordance with the method according to the present invention, whereby a micromembrane pump of the kind described hereinbefore with respect to FIG. 2 and 3 is produced. For connecting the actor device to the pump body, arbitrary methods known in the field of technology can be used.

In the following, the methods according to the present invention used for producing a pump body which is suitable for the micromembrane pump according to the present invention will be described in more detail.

The starting material used for the valve unit is preferably silicon. As has been described hereinbefore, the production of the pump body with the integrated valve unit according to the present invention permits a small pump chamber volume. This applies especially to the internal valve chip which contributes to the pump chamber volume. It is, however, apparent that the present invention also provides an advantageous method of forming a pump body of the type shown e.g. in FIG. 1. Hence, it is apparent to those skilled in the art that the steps which are carried out in the case of the respective embodiments of the method according to the present invention for thinning one or both of the semiconductor plates forming the valve body are optional.

A first method is now described making reference to FIG. 6. The valve body with the integrated valve structure is formed making use of two semiconductor plates, preferably silicon plates, which are first subjected to treatments of the same kind in steps a)–c).

First of all, the valve chips 200 are prestructured on their front side, i.e. on a main surface thereof, so as to define a valve flap structure 202 and a valve seat structure 204, said prestructuring being carried out e.g. by means of an etching process. This prestructuring is shown in a step a) in FIG. 6. In a next step of said embodiment of the method according to the present invention, valve flap wells 206 and valve opening wells 208 are formed, e.g. by wet chemical etching processes, starting from the back of the chip in a predetermined relationship with the valve flap structures 202 and the valve seat structures 204, cf. step b). Following this, the valve chips 200 of this embodiment are coated with an oxide layer 210 on the upper surface thereof, step c).

Subsequently, the two chips are connected, e.g. by anodic bonding processes or by silicon fusion bonding, on the chip surfaces coated with the oxide layer, cf. step d). The two chips are arranged in such a way that the valve seat structures of one chip are in alignment with the valve flap structures of the other chip and vice versa. This results in a connection of the valve flaps and of the valve seat and, consequently, in a mechanical stabilization with the aid of which damage to the valve flaps will reliably be prevented during the subsequent thinning process.

The pair of wafers 212 obtained after step d) is then thinned on one side thereof, cf. the upper wafer in step e), whereby the valve wells 206, 208 of the thinned wafer should be given the flattest possible shape. Subsequently, a final wet chemical etching process is carried out by means of which the flap structures are exposed and the valve seats are opened, cf. step f). The method according to the present invention used for producing the pump body with an integrated valve structure according to the present invention is now finished.

Making reference to FIG. 7, an alternative method will be described in the following. First of all, valve seat structures 204 and valve flap structures 202 are defined in a main surface of the valve chip 200 in a manner corresponding to step a) in FIG. 6. Subsequently, valve flap wells 216 and valve opening wells 218 are produced in a step g) on the back of the chip. In this embodiment, the wells have a well depth corresponding to the well depth of the finished pump chip. After this structuring the valve wafers are again connected so as to define a valve unit 222, cf. step h). The essential difference in comparison with the method described with respect to FIG. 6 is to be seen in the last step; in the method shown in FIG. 7, the thinning of the wafer is not carried out mechanically on one side, but in a step i) by chemical processes on both sides. The chemical etching process is carried out until the flaps and the valve openings, respectively, have been exposed. The result is a pair of wafers consisting of two wafers having the same thickness.

A further alternative method according to the present invention will be explained hereinbelow making reference to FIG. 8. Steps a) and g) shown in FIG. 8 correspond to steps a) and g) shown in FIG. 7. Subsequently, the valve chips are again connected so as to form a valve unit, as can be seen in a step j), the inlet and the outlet being still closed at this stage. Now an etching mask 230 is, however, applied to the surface of the lower chip with the exception of the structured wells 216 and 218. Hence, only the upper chip will be thinned in a subsequent wet chemical etching process, whereas not the entire lower chip is thinned together with the upper one, since the mask 230 prevents etching of the whole chip so that the lower chip is etched only in the prestructured wells 216 and 218 and has the original thickness when the structure has been finished, cf. step k). Hence, a wafer package is obtained, which, after the exposure of the flaps, includes a planar valve unit directed towards the pump chamber, when the pump chamber is defined by the pump body and a micromembrane attached to the upper chip.

The pump body produced according to one of the above-described methods can now be connected to a drive unit. An economy-priced and simultaneously reproducable connection technique can, however, only be realized when mounting takes place at wafer level. Also for this connection, a large number of techniques and methods offer themselves, e.g. glueing, silicon fusion bonding, anodic bonding and eutectic bonding. High-temperature methods can again entail a depolarization of the piezomaterial and may therefore necessitate a subsequent polarization of the piezoactor.

When the drive unit has been connected to the valve body, the micromembrane pumps shown in FIGS. 2 and 3 are obtained; by means of the methods described, pump bodies can be obtained which permit, in combination with the drive means described, a high compression ratio, i.e. a high ratio of the displaced pump volume to the total pump chamber volume.

What is claimed is:

1. A method of producing a pump body having an inlet opening provided with an inlet valve and an outlet opening provided with an outlet valve, said method comprising the steps of:
   1.1 structuring a respective first main surface of a first and of a second semiconductor disc for defining a valve flap structure of the inlet valve and a valve seat structure of the outlet valve in the first disc and a valve flap structure of the outlet valve and a valve seat structure of the inlet valve in the second disc;
   1.2 forming a valve flap well structure and a valve opening well structure in a respective second main surface of the first and of the second semiconductor disc;
   1.3 connecting the first main surface of said first and second semiconductor discs such that each respective valve flap structure is aligned with a respective valve seat structure;
   1.4 thinning at least one of the semiconductor discs starting from the second surface; and
   1.5 etching the respective second main surface of said first and of said second semiconductor disc at least in the area of the valve flap well structure and of the valve opening well structure so as to expose the valve flaps and open the valve seats.

2. A method according to claim 1, comprising, prior to step 1.3, the step of providing the respective first surface of the first and of the second semiconductor disc with an oxide layer (210).

3. A method according to claim 1 or 2, wherein the semiconductor plates (200) are connected by means of an anodic bonding process in step 1.3.

4. A method according to claim 1, wherein at least one semiconductor disk is thinned starting from the second surface by means of mechanical removal methods, the valve flap well structures and the valve seat well structures being formed in step 1.2 in said semiconductor plates with such a depth that after the thinning of the at least one semiconductor disc the valve flap well structures and the valve seat well structures have a depth corresponding to the depth of the final valve wells after step 1.5.

5. A method according to claim 1, wherein the valve flap well structures and the valve seat well structures are formed in step 1.2 in the semiconductor plates with a depth corresponding to the depth of the final valve wells after step 1.5.

6. A method according to claim 5, wherein the two semiconductor plates are thinned starting from the second surface by means of chemical etching processes.

7. A method according to claim 5, wherein only one semiconductor plate is thinned starting from the second surface by means of chemical etching processes, whereas, prior to the thinning of said one semiconductor plate, the other semiconductor plate is provided with a mask on the second main surface thereof in such a way that said other semiconductor plate is etched only in the area of the valve flap well structure and in the area of the valve seat well structure.

8. A method according to claim 6, wherein the thinning of the at least one semiconductor disc and the etching in step 1.5 are carried out in one process step.

9. A method according to one of the claim 1 to 8, wherein silicon discs are used as semiconductor discs.

10. A method according to claim 1, wherein a plurality of valve flap structures and valve seat structures and a plurality of valve flap well structures and valve flap seat structures are formed in each of said first and second semiconductor discs, the semiconductor discs being diced after step 1.5 so as to form individual pump bodies.

* * * * *